US011709091B2

(12) United States Patent
McDonald et al.

(10) Patent No.: US 11,709,091 B2
(45) Date of Patent: Jul. 25, 2023

(54) REMOTE MONITORING OF VEHICLE SCALE FOR FAILURE PREDICTION

(71) Applicant: Scale Truth, LLC, Troy, MI (US)

(72) Inventors: Eric McDonald, Saginaw, MI (US); Benjamin Neeb, Saginaw, MI (US); Saadman Bin Abdullah, Saginaw, MI (US)

(73) Assignee: Truthio, LLC, Troy, MI (US)

( * ) Notice: Subject to any disclaimer, the term of this patent is extended or adjusted under 35 U.S.C. 154(b) by 413 days.

(21) Appl. No.: 16/857,506

(22) Filed: Apr. 24, 2020

(65) Prior Publication Data

US 2021/0333146 A1 Oct. 28, 2021

(51) Int. Cl.
*G01G 23/01* (2006.01)
*G01G 23/42* (2006.01)
*G01G 19/02* (2006.01)

(52) U.S. Cl.
CPC ........... *G01G 23/01* (2013.01); *G01G 19/021* (2013.01); *G01G 23/42* (2013.01)

(58) Field of Classification Search
CPC ....... G01G 23/01; G01G 19/021; G01G 23/42
See application file for complete search history.

(56) References Cited

U.S. PATENT DOCUMENTS

| 4,691,290 | A | * | 9/1987 | Griffen | G01G 3/1414 |
| | | | | | 705/415 |
| 4,802,052 | A | * | 1/1989 | Brant | H01R 13/7135 |
| | | | | | 361/45 |
| 4,815,547 | A | * | 3/1989 | Dillon | G01G 3/18 |
| | | | | | 73/1.13 |
| 5,172,783 | A | * | 12/1992 | Feinland | G01G 19/005 |
| | | | | | 177/185 |
| 5,623,128 | A | * | 4/1997 | Grimm | G01G 3/18 |
| | | | | | 177/229 |
| 5,780,782 | A | | 7/1998 | O'Dea | |
| 5,878,376 | A | * | 3/1999 | Schurr | G01G 23/015 |
| | | | | | 702/85 |
| 6,576,849 | B2 | * | 6/2003 | Bliss | G01G 23/01 |
| | | | | | 177/199 |

(Continued)

FOREIGN PATENT DOCUMENTS

KR 20120080792 A 7/2012

OTHER PUBLICATIONS

European Search Report issued in corresponding Patent Appln. No. EP21170322, dated Dec. 9, 2021.

*Primary Examiner* — Randy W Gibson
(74) *Attorney, Agent, or Firm* — MaxGoLaw PLLC

(57) ABSTRACT

A method for remote monitoring of operating characteristics of a load cell is provided. The method includes receiving from a plurality of sensors, at a main unit, sensed data indicative of a plurality of operating characteristics of a load cell. The method continues by analyzing at a main unit the sensed data for statistical control and sending alerts to a remote computing device when sensed data of an operating characteristic is outside of a preset threshold. A system for carrying out the method is also provided. The system includes a main unit installed near a load cell, a first sub-unit coupled to a scale of the load cell in wired communication with the main unit, and at least one remote computing device in network communication with the main unit.

19 Claims, 2 Drawing Sheets

(56) References Cited

U.S. PATENT DOCUMENTS

| | | |
|---|---|---|
| 7,211,748 B2 * | 5/2007 | Lauke ................ G01G 19/4142 |
| | | 177/199 |
| 7,441,436 B2 | 10/2008 | Bliss et al. |
| 8,648,266 B2 * | 2/2014 | Bucher .............. G01G 23/3707 |
| | | 177/199 |
| 2003/0010542 A1 | 1/2003 | Simons |
| 2008/0110681 A1 * | 5/2008 | Von Arb .............. G01G 3/1414 |
| | | 177/50 |
| 2011/0220424 A1 | 9/2011 | Sagarsee et al. |
| 2013/0081451 A1 | 4/2013 | Kamada et al. |

* cited by examiner

REMOTE MONITORING OF VEHICLE SCALE FOR FAILURE PREDICTION

FIELD OF THE INVENTION

The present invention in general to remote monitoring systems and more particularly to remote monitoring of weighing systems to detect problematic states and predict failures and their root causes.

BACKGROUND OF THE INVENTION

In many industries it is important to determine the weight of a cargo load. For example, in shipping and trucking industries, the cost of delivering a load for commercial purposes is assessed to the customer according to the weight of the load and the distance it must travel. Similarly, in agricultural industries or scrap and recycling industries, a purchaser buys goods based on the weight of the load delivered. Accordingly, such industries commonly rely on weighing facilities to determine the weight of the loads being transported. Often times, weighing facilities, shippers, scrap yards, or agricultural facilities provide scales in order to weight cargo loads for cost calculations and other purposes. It is crucially important that such scales be accurate given that associated monetary transactions are often based on the load data determined by such scales.

Unfortunately, though, even with the great importance of such cargo load scales, the weighing systems currently in place can produce erroneous weights which result in inaccurate measurement and erroneous cost calculations due to, for example, environmental factors such as rain, ice, and snow build up, technical glitches involving screens and displays, or component wear and failure. Such errors may go undetected for significant periods of time, resulting in inaccurate measurements and under or over payments. Upon discovery of such errors, the scale must shut down all weighing operations and offsite service technicians must be brought in to troubleshoot, inspect, and repair the equipment, which causes lost revenue for the weighing facilities, great expenditure by the weighing facilities for the technical experts' repair services, and slowdowns in product delivery.

Traditionally, when a scale is suspected to have an issue, another scale may be used for comparison against the suspect scale. However, many weighing facilities only have one scale and thus have to use information from drivers/users as to what weight they believe a load to be or what weight was measure at another facility in order to determine if there is a significant issue with a particular scale. Additionally, service companies use test weights and inspection to determine if a suspect scale is performing nominally; however, such measures take a great deal of time during which a scale may be producing inaccurate readings or may be entirely shutdown, resulting in an unknown amount of loss. As a quick fix, some weighing facilities or repair services may attempt to recalibrate the scale, including the deficiency contributing to the weight deviation, for example, recalibrating scales that are bound up with snow, ice, mud, sand, trash and other debris or recalibrating scales that have worn out components that are no longer able to function as designed, which is illegal to use for trade per the national weighing standard (HB-44, G-UR.4.3. Use of Adjustments).

Given the difficulty of even knowing when a scale, also referred to herein as a load cell (LC), is malfunctioning and the problems associated with a malfunctioning scale, attempts have been made to develop systems that monitor the weighing integrity of a scale. Such systems typically locally monitor for scale faults by including devices to measure symmetry of a load cell compared to other load cells at a given facility; overload checks where a load applied to a load cell is compared to its rated capacity; counters based on time or number of weighments to monitor sensitivity, eccentricity of areas across the scale, and repeatability; indicator diagnostics showing voltage, temperature, and pressure; indicator functionality checks such as testing displays, keyboards, associated computers and memories. These measures provide the ability to monitor weighing systems for faults and, in some instances the ability to report those faults to a local computer at the weighing facility. However, systems are reactive as opposed to predictive and provide an incomplete set of data and require additional processing to extract and understand the data. Additionally, these reactive systems still require shutting down the malfunctioning scale, paying a technical expert to visit the load cell in person to inspect, analyze, and diagnose the root cause of a reported fault, which results in erroneous measurements until discovery and loss of the ability to use the malfunctioning scale once it is discovered.

Thus, there exists a need for a monitoring system for weighing systems that monitors the functionality of the various components of such systems, detects problematic states, and predicts failures and their root causes at a remote location thereby enabling real time monitoring by technical experts, prediction of failures, and preventative maintenance to reduce inaccurate measurements and downtime associated with malfunctioning scales in need of repair.

SUMMARY OF THE INVENTION

A method for remote monitoring of operating characteristics of a scale is provided. The method includes receiving from a plurality of sensors, at a main unit, sensed data indicative of a plurality of operating characteristics of a load cell. Operating characteristics include zero values, individual load cell values, shift in overall load cell values, values at various positions on the load cell, weight measurements, count of measurements, highest measurement of a time period, temperature, water, level, motion, time with motion vs time without, depth of debris under the scale or load cell, metal in the vicinity of the load cell, power supply interruptions, or any combination thereof. The method continues by analyzing at a main unit the sensed data for statistical control and sending alerts to a remote computing device when sensed data of an operating characteristic is outside of a preset threshold. A system for carrying out the method is also provided. The system includes a main unit installed near a load cell, a first sub-unit coupled to a scale of the load cell in wired communication with the main unit, and at least one remote computing device in network communication with the main unit.

BRIEF DESCRIPTION OF THE DRAWINGS

The present invention is further detailed with respect to the following drawings that are intended to show certain aspects of the present invention but should not be construed as a limit on the practice of the present invention.

DESCRIPTION OF THE INVENTION

Figure 1:
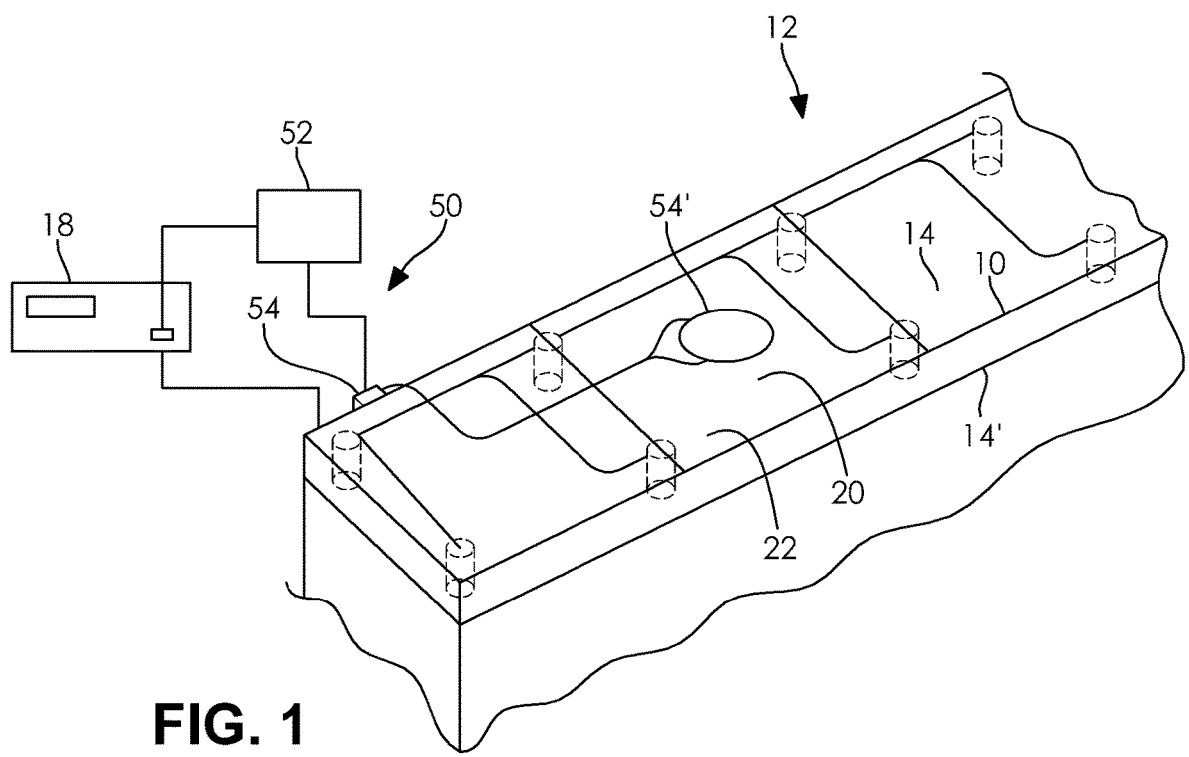
FIG. 1 is a schematic drawing of a remote monitoring system according to embodiments of the present invention.

The present invention has utility as a monitoring system for weighing systems that monitors the functionality of the various components of such systems, detects problematic states, and predicts failures and their root causes at a remote location thereby enabling real time monitoring by technical experts, prediction of failures, and preventative maintenance to reduce inaccurate measurements and downtime associated with malfunctioning scales in need of repair. The present invention also has utility as a real time remote monitoring system for industrial flow meters.

The present invention will now be described with reference to the following embodiments. As is apparent by these descriptions, this invention can be embodied in different forms and should not be construed as limited to the embodiments set forth herein. Rather, these embodiments are provided so that this disclosure will be thorough and complete, and will fully convey the scope of the invention to those skilled in the art. For example, features illustrated with respect to one embodiment can be incorporated into other embodiments, and features illustrated with respect to a particular embodiment may be deleted from the embodiment. In addition, numerous variations and additions to the embodiments suggested herein will be apparent to those skilled in the art in light of the instant disclosure, which do not depart from the instant invention. Hence, the following specification is intended to illustrate some particular embodiments of the invention, and not to exhaustively specify all permutations, combinations, and variations thereof.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention.

Unless indicated otherwise, explicitly or by context, the following terms are used herein as set forth below.

As used in the description of the invention and the appended claims, the singular forms "a," "an" and "the" are intended to include the plural forms as well, unless the context clearly indicates otherwise.

Also as used herein, "and/or" refers to and encompasses any and all possible combinations of one or more of the associated listed items, as well as the lack of combinations when interpreted in the alternative ("or").

Implementations described herein provide a system and method for one or more users (e.g., a scale operator, scale serviceperson, or technical expert) to remotely monitor operating characteristics of one or more load cells. The operating characteristics include, but are not limited to, any of zero counts, individual load cell counts, counts at various positions on the load cell (e.g. ends and middle), number of weighments, highest weighment of the day, weight measurements, and environmental factors such as temperature, water, level, motion, depth of debris under the load cell, metal or other objects in the vicinity of the load cell, or any combination thereof. The operating characteristics are gathered using a load cell monitoring system that incorporates a remote computing interface, such as a web browser used on a remote computing device, such as a smart phone, computer, or tablet; a main unit including at least one printed circuit board (PCB), a local computing device containing a microprocessor, and a programmable microcontroller; and at least one sub-unit including one or more sensors. Additionally, a user can manually input information into the computing device, such as known environmental factors, maintenance and repair information, known operating errors, and the like. The information gathered by load cell monitoring system can then be transmitted from the local computing device of the main unit to one or more remote computing device monitored by a remote user. The remote users can then receive information about the load cell's condition using a remote monitoring system. In some implementations, a load cell monitoring system transmits information directly to the one or more remote computing devices and/or the load cell monitoring system transmits information first to a remote server, which then transmits information to the remote computing devices.

For purposes of illustration only, the following example is a non-limiting exemplary environment in which implementations of remote monitoring systems described herein can be used.

In this exemplary environment, for example as shown in FIG. 1, a load cell 10 may be monitored by several different users, local and remote. For example, the users are on-site load cell operators, on-site load cells servicepersons, and/or remote operators or servicepersons. As shown in FIG. 1, a typical scale or weighing system 12 includes a load cell(s) 10 having a loading area 14 and an bottom side 14'. The scale 12 also includes an indicator 18 that displays a weight measured by the load cell(s) 10. Some scales 12 additionally include a drainage system 20 positioned below the loading area 14 for draining water and other liquids away from the scale 12 and load cell(s) 10. Some drainage systems 20 include a sump 22. According to embodiments, a scale or weighing system 12 is implemented with a continuous condition and characteristic monitoring system 50. It will be understood that new scales can be manufactured to include a continuous condition and characteristic monitoring system 50, while existing scales can be retrofitted to include a continuous condition and characteristic monitoring system 50.

Figure 2:
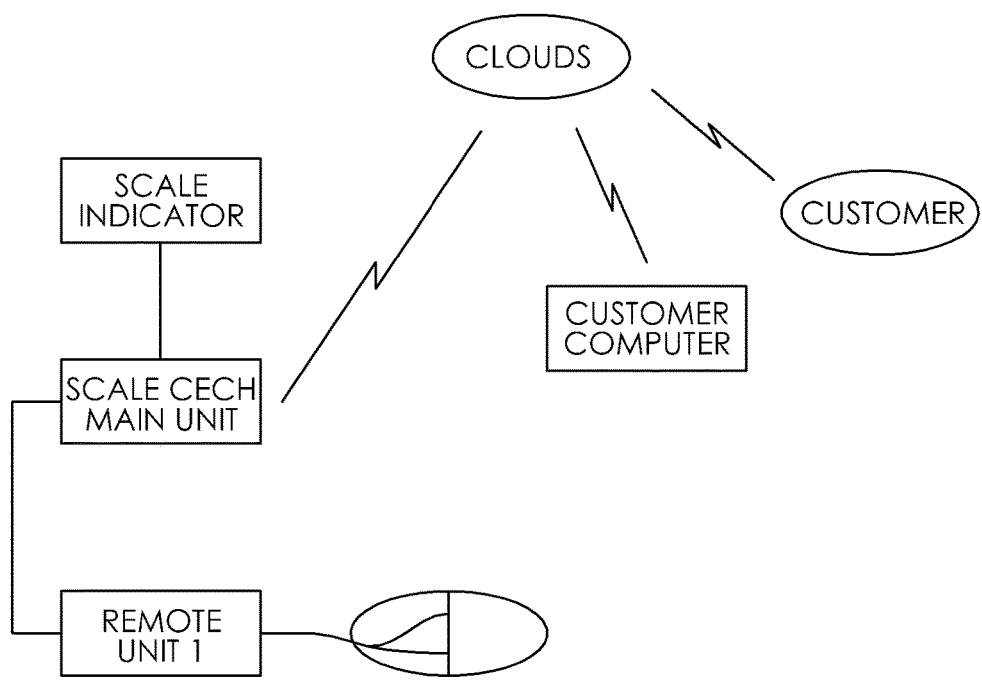
FIG. 2 a schematic drawing of connectivity and information flow in a remote monitoring system according to embodiments of the present invention.

As shown in FIG. 1, embodiments of a continuous monitoring system 50 include a main unit 52, at least one sub-unit 54, 54', and at least one remote computing device (shown in FIG. 2). The main unit 52 includes at least one printed circuit board (PCB), a local computing device containing a a programmable microcontroller. As shown in FIG. 1, the main unit 52 of the monitoring system 50 is installed adjacent to the scale 12 near the indicator 18. The main unit 52 is electrically tied to the indicator 18 of the scale 12, the main unit 52 receiving power therefrom. According to embodiments, the main unit 52 is in serial communication with the scale indicator 18, for example using an RS 232, 485 communication standard. The main unit 52 is configured to log data received from the sub-unit(s) 54, 54', perform computations, and transmit the data and computations to other components of the system 50 via an internet connection, such as a 2G, 3G, or LTE connection.

The at least one sub-unit 54, 54' includes one or more sensors. The at least one sub-unit 54, 54' is installed on the second side 14' of the scale 12, that is, underneath the scale, to avoid interference with weighing traffic and to ensure consistent measurements are taken. Such an underneath location on the second side 14' of the scale 12 avoids sun, shade, and precipitation and is better able to measure ambient temperature, flooding, and build-up of debris under the scale 12 that may interfere with proper measurements and scale functionality. The main unit 52 is connected to a first of the at least one sub-units 54 via communication bus such as a digital and/or analog signal(s). It is appreciated that signal can be extended over longer distances using conventional techniques. Communication buses operative herein illustratively include scalable coherent interface (SCI), small computer system interface (SCSI), disk/tape peripheral attachment bus, controller area network (CAN bus), and serial attached SCSI (SAS).

The at least one sub-unit 54 includes a plurality of sensors including, but not limited to, an accelerometer, a magnetometer, an air temperature sensor, and a depth sensor, which is, for example, an ultrasound depth sensor. As shown in FIG. 1, the monitoring system 50 also includes a second sub-unit 54' that is displaced from the first sub-unit 54. The second sub-unit 54' includes a plurality of sensors including, but not limited to, a water level sensor and a water temperature sensor. According to embodiments, a displaced second sub-unit 54' is installed near or in the drainage system 20 of the scale 12. The second sub-unit 54' is connected to the first sub-unit 54 via similar bus (digital and/or analog). Alternatively, the second sub-unit 54' is connected to the main unit 52 via similar bus.

The condition data sensed by the plurality of sensors of the at least one sub-unit 54, 54' is communicated to and logged by the main unit 52. The main unit 52 analyzes and runs computations based on the data collected by and communicated from the sub-unit(s) 54, 54'. The main unit 52 then communicates the collected data, the analyzed data, and/or the computations based on the data to at least one remote computing device 60 via a 2G, 3G, of LTE connection According to embodiments, the main unit 52 communicates to the at least one remote computing device 60 via a cloud or server 70. The at least one remote computing device 60 may be any of a smart phone, a computer, a tablet, or a combination thereof. The at least on remote computing device 60 provides a user dashboard that presents the collected data, the analyzed data, and/or the computations based on the data to a user. Additionally, a user may receive alters to a remote computing device 60 via email and/or SMS.

The inventive monitoring system 50 provides a more holistic and more detailed picture of the overall health of a scale 12 as compared to existing systems that tend to detect errors once they have occurred but do not provide insight or alerts as to possible root causes of those errors. For example, existing load cell monitoring systems may be able to detect an imbalance load cell(s) that results in a scale weighing error, but do not and cannot alert a serviceperson to a possible cause for such an imbalance. Instead, once such an error is reported, a serviceperson is required to visit the scale and troubleshoot the error in order to determine a possible cause of the imbalance. In contrast, the inventive remote monitoring system 50 is able to alert users to a scale error, for example an imbalance of load cell(s), and also provide data that indicates a root cause of the error, such as whether there is material built-up under the scale, whether there was a large shock or blow experienced soon before the imbalance or error, whether there is a misalignment or seized or damaged component, or whether the error is likely caused by long term damage such as corrosion due to components being submerged. Accordingly, the present invention provides a larger, more detailed view of all relevant factors that contribute to an error state or condition of a scale or weighing system, and thus enables a better, faster response to avoid scheduling a loss to a weigh facility.

Embodiments of the inventive remote monitoring system 50 also provide predictive monitoring such that preventive repair and maintenance measures may be undertaken before a scale ever experiences an error. That is, rather than using a static, inflexible style of testing based on guessing that must be customized for each scale, the present invention statistical approach that obtains a unique understanding of each load and its specific environmental surroundings. To do so, the present invention employs 3 Sigma control limits for monitored condition variables and paired T-tests for quality control statistics. An algorithm of the remote monitoring system 50 uses these statistics to automatically take into account and set thresholds for the myriad factors that affect the performance of each load cell. Thus, the present invention avoids the need to catalog every single variation of scale performance and the need to set overly broad, general limits that may miss true alerts for some scales and generate false alarms for others. Instead, the remote monitoring system 50 of the present invention determines and sets thresholds intelligently without interventions by a user and alerts a user to conditions that may lead to or result in a weighting error before such an error becomes a reality.

Figure 3:
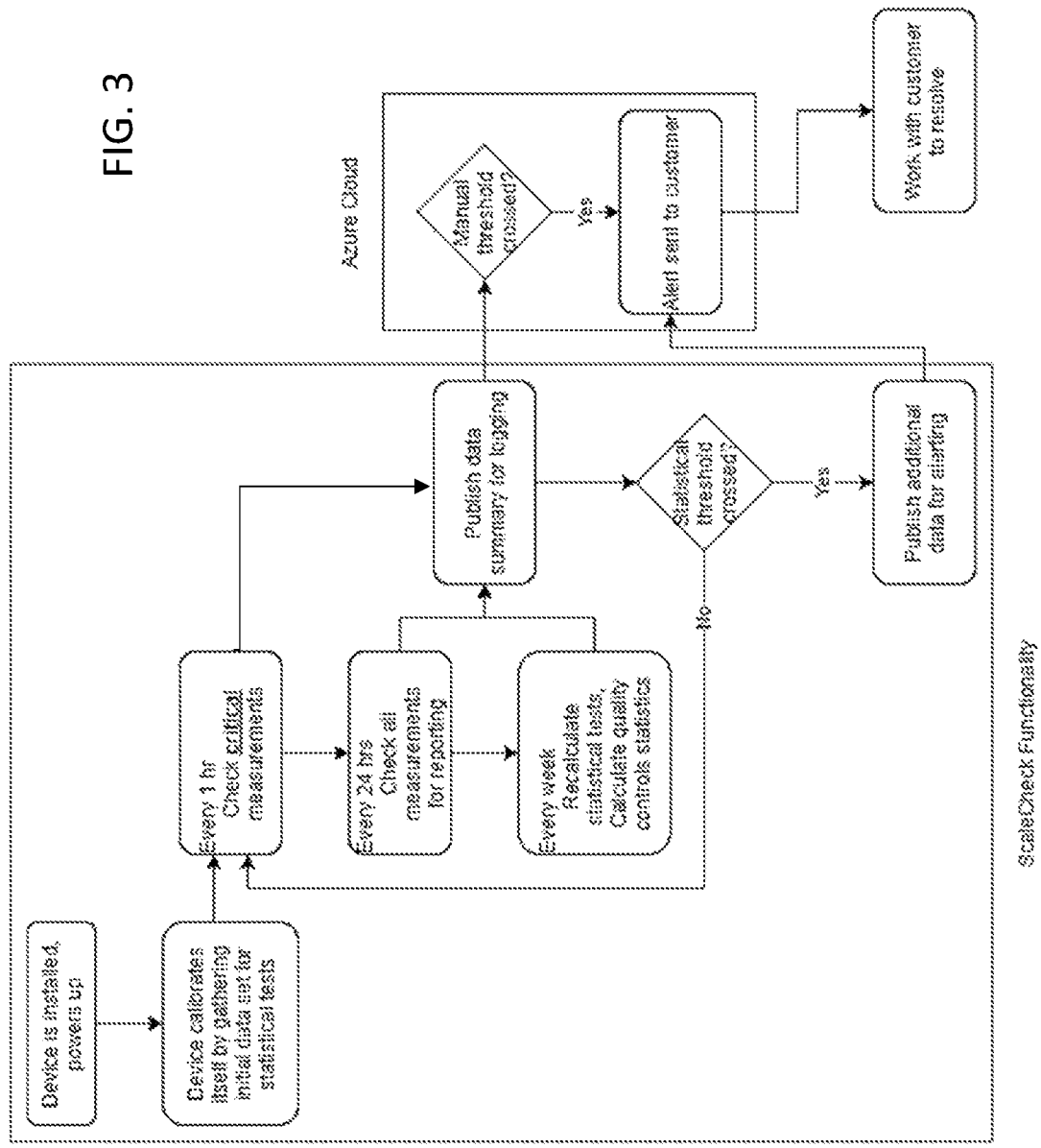
FIG. 3 is a flowchart showing a method for remote monitoring of a load cell according to embodiments of the present invention.

The algorithm utilized in the present invention is detailed in FIG. 3. With the inventive device installed and powering up, a series of measurements are taken to establish a baseline (3 sig control limits) for sensor data. The inventive device then calibrates based on a first set of quality statistics that are available through digital data storage in a memory for later comparison that illustratively includes checks if 3 sig control limits have changed beyond a preselected threshold. Sensor data is analyzed continuously as a basis to follow a hierarchy for action. As shown in FIG. 3, checks are provided of varying scope on time scales of measurements at one hour, one day, and one week. It is appreciated that these are only exemplary time frames. Furthermore, analysis timing can be continuous or done at a preselected frequency. Issues with critical measurements are processed immediately to provide both alerts and publishing to a log. As shown in FIG. 3, every day (24 hours) all measurements are published to the log. It is appreciated that in some embodiments, batching reduces data consumption and is well suited for instances in which there have been no critical errors. Manual threshold (user requirements) and statistical threshold (process control) are compared to measurements and if the measurements exceed either threshold, or obth thresholds, alerts are accordingly sent. On a longer time range, such as the week shown in FIG. 3, baseline for sensor data is recalibrated, and quality control testing (e.g. paired t-test) is performed to determine if process has significantly changed. Exemplary factors that would cause changes include environmental changes such as heavy rain, snow, debris influx, or temperature; sample weight extremes or frequency; performance shifts as to wear and tear; or combinations thereof. In some inventive embodiments, alerts associated with a server or customer device are readily customized.

Additionally, embodiments of the inventive remote monitoring system 50 provide a user with trend reports available on the remote computing device(s) 60. Such trends are developed by way of the system 50 collecting and analyzing the load cell data. The algorithm automatically identifies trends in the collected and analyzed data regarding the operation and conditions of the load cell. Such trends enable a user to identify and prioritize areas of the load cell that are ready for improvement in order to reduce variation and create more robust load cells and avoid weighing errors and shutdowns caused by such weighing errors. These trend reports are more than the timestamped error logs of fault reporting, sum or errors, and temperature reports available in existing local monitoring systems. The trend reports of the inventive remote monitoring system 50 continuously read and show data points, but also presents a holistic picture of the health and operation of a load cell. That is, the dashboard on a remote computing device 60 is able to provide a user with time plots of all condition applicable variables, revealing patterns such as clusters or spikes in operation conditions that may correlate or otherwise help explain situations that lead to weighing errors. The present invention also compiles weekly technical summaries that are visible in the dashboard on the remote computing device(s) 60 to statistically discriminate and highlight trends, beyond simple reporting.

According to embodiments, the inventive remote monitoring system 50 may be installed on a new or existing scale 12. A manufacturer of serviceperson installs the remote monitoring system 50 to a load cell 10 by positioning a main unit 52 near the scale 12 and electrically connecting the main unit 52 to the indicator 18 of the load cell 10. Installation continues by attaching at least one sub-unit 54 to the underside 16 of the scale 12 and according to some inventive embodiments, a second sub-unit 54' is installed within a drainage system 20 of the load cell 10. In some inventive embodiments, at least one sub-unit 54, 54' is then connected to the main unit 52 via wires that provide an analog signal between the units. Next the remote monitoring system 50 is calibrated. That is, an operation baseline is established by collecting operation data. Operation data that is collected to establish a baseline of operation includes, but is not limited to, any of zero counts, individual load cell counts, counts at various positions on the load cell (e.g. ends and middle), number of weighments, highest weighment of the day, weight measurements, and environmental factors such as temperature, water, level, motion, depth of debris under the load cell, metal or other objects in the vicinity of the load cell, or any combination thereof. Upon collecting this calibration data, the computing device of the main unit 52 analyzes the data to compute and catalog statistics to enable preventive altering. Namely, the algorithm analyzes control chart statistics for each set of data points illustratively including 3 sigma, a mean, and standard deviation and analyzes quality control statistics wherein regular recalculation of control chart statistics are compared using paired T-test values and significant level of 0.05.

As time goes on and the load cell 10 is used in the normal course of business, the remote monitoring system 50 continues to monitor and collect data regarding the operation and condition of the load cell 10 to identify operation and condition trends and potential error causing conditions before they occur. FIG. 3 shows a flowchart of the operation of the remote monitoring system 50. That is, the remote monitoring system 50 continually monitors and checks critical data points that are being monitored by the plurality of sensors in the at least one sub-unit 54, 54', regularly checks all data points, regularly recalculates quality control statistics to continually and automatically adjust the thresholds that would generate a condition alert, and monitor for statistically significant values that are identified. In the event that a statistically significant value is identified, the remote monitoring system 50 sends an alert to the remote computing device 60, publishes the identified value on the dashboard of the remote computing device 60, and ensures a user or service person addresses the condition that caused the statistically significant value. In the event that the remote monitoring system 50 does not identify a statistically significant value, the system 50 continues to monitor the load cell 10 and report the collected data to the remote computing device 60 at less frequent intervals so as to not overwhelm the user with information. With this information, the remote monitoring system 50 is able to scientifically and dynamically predict downtime of a load cell 10 and thus allow a load cell 10 to avoid maintenance and service unless such maintenance and service are actually required. Additionally, load cells having the inventive remote monitoring system 50 limit weighing errors that lead to loss given that the operation and condition factors of each individual load cell is so closely monitored. Furthermore, the inventive remote monitoring system 50 enables weighing facilities to improve the quality and continuity of their weighing services. That is, the remote monitoring system 50 gives weighing facilities the ability to identify and prioritize maintenance and improvements, allowing facilities to be proactive rather than reactive only after a load cell shows signs of error of fails.

According to embodiments, the main unit 52 is in communication with a gateway device, either wired communication or wireless communication. The gateway transmits information gathered by the remote monitoring system 50 wirelessly to the secure server or cloud over a cellular network, Wi-Fi network, and the like.

The remote server or cloud is configured to store the monitoring information received from the remote monitoring system. The system compares the sensed values of the load cell (generated by the continuous remote monitoring system and transmitted to the server via the gateway) to predetermined thresholds and initiating an action if a threshold is exceeded. For example, the server can compare a current sensed condition value with a predetermined alert generating threshold that has been determined by the algorithm and initiate a notification, such as a text message over a cellular network, to a remote computing device if a monitored condition value exceeds the threshold. The server can also provide historical and current operating condition values to the remote computing device on demand.

As discussed above, the remote monitoring system is configured to alert a user to operation characteristics of a load cell. The remote monitoring system generates and receives notifications from the server when an automatically generated threshold is crossed with respect to any of the monitored operation conditions, notifying the user of the condition of the load cell or of a predictive condition of the load cell. The remote monitoring system can also be used to view historical information about the monitored operating characteristics of the load cell and automatically modify notification rules, such as the threshold levels that trigger alerts.

According to embodiments, the inventive remote monitoring system operates on a network, which illustratively can include any communication medium, such as wired and wireless networks including cellular networks, local area networks, wide area networks, Wi-Fi networks, the internet, and the like. The network can also include one or more servers to process the data received from plurality of sensors and transmit notifications and data to one or more remote computing devices either automatically or in response to a request from a remote computing device. Each remote computing device can be associated with an individual that is interested in monitoring the operating conditions of one or more of load cells using an inventive remote monitoring system. Each remote computing device can be associated with a user, such as technical expert, service person, weighing facility operator, and the like. As discussed above, the remote computing device includes a computing device that receives notifications from a network and requests additional information, such as historical data generated by one or more remote load cell monitoring systems.

According to embodiments, the inventive remote monitoring system also includes a workstation. The workstation may be a computing device, such as a personal computer, that has access to the remote monitoring system for configuring settings of system during calibration and/or viewing information associated with one or more remote monitoring systems, such as reports generated by remote monitoring system based on a load cell's operating characteristic data.

Using the remote monitoring system, one or more remote computing devices can monitor one or more remote load cell monitoring systems. That is, a load cell can be monitored from multiple remote computing devices at the same time, allowing multiple interested users to view and monitor the operating conditions of a single load cell at a given time. Various permissions and invitations can be used to limit which remote computing devices can access a given remote monitoring system of a particular load cell.

In some example implementations, the remote computing device 60 may comprise one or more of the following: a mobile station, a wireless terminal, a tablet, a smart phone, or the like. For example, the remote computing device may be implemented as a wireless handheld device, a wireless plug-in accessory, or the like. Moreover, the remote computing device may be implemented as multi-mode device configured to operate using a plurality of radio access technologies, such as Long Term Evolution (LTE), wireless local area network (WLAN) technology, such as 802.11 Wi-Fi and the like, Bluetooth, Bluetooth low energy (BT-LE), near field communications (NFC), and any other radio access technologies. Moreover, the remote computing device may be configured to establish connections to access points in a network, such as cellular base stations, Wi-Fi access points, and the like, using at least one of the plurality of the radio access technologies. Although some of the examples herein refer to the remote computing device as a mobile, wireless device, the remote computing device may also be implemented as a stationary device, such as a personal computer and the like.

In some example implementations, a secure server may register and/or configure one or more of the main unit 52, sub-unit(s) 54, 54', and remote computing device 60 before the remote monitoring of a load cell is initiated, although registration and/or configuration may occur at other times as well. The registration process may be performed to register the main unit 52, sub-unit(s) 54, 54', and remote computing device 60 with the secure server or cloud. Moreover, the configuration process may be performed to configure the system including the identities of the one or more remote computing devices used to monitor the load cell, configure one or more rules used to trigger notification messages to the remote computing devices, configure one or more rules designating primary and secondary remote computing devices, configure one or more rules establishing schedules for the primary and secondary monitoring operations, configure one or more rules defining an escalation sequence representative of when to elevate an event to an alert, and the like.

A sub-unit 54, 54' communicates sensor data to the main unit 52, which then forwards the sensor data to the secure server or cloud. The secure server or main unit may determine whether one or more of the remote computing devices should be sent a notification message regarding an event. The secure server or main unit may determine whether to send a notification message to a remote computing device based on received sensor data (as well as any other data available at the secure server), which triggers an event (or satisfies a rule) at the secure server. For example, a secure server or main unit may receive the sensor data and then process the received sensor data alone or along with other data (e.g., historical data, data from other sources of load cell operating or environmental information, and the like) to determine whether to send the notification message alerting the remote computing device of the event. It is appreciated that such data is readily analyzed using conventional statistical models or artificial intelligence. The secure server may also receive information from other systems, such as a weather alert or traffic alert system, and this information may be used to trigger notification messages to the remote computing device. In addition, the secure server may send notification messages to confirm whether the remote computing device is still actively monitoring the load cell.

To illustrate by way of an example, the main unit 52 may receive sensor data from at least one sub-unit 54, 54' and process the sensor data. If the main unit 52 determines that the sensed data is outside a threshold limit or when compared with previously sensed data indicates a concerning trend, the main unit 52 will transmit the sensor data to a secure server or cloud, according to some embodiments via a gateway and network. Additional analysis and processing of the sensor data may determine that the measured data is outside one or more rules defining events and then follow its self-imposed rules defining the identities of the remote computing devices that are deemed to need to receive a notification message indicating the operating condition of the load cell. For example, the rule may define that when a high level of debris is detected under a load cell, a certain remote computing device, such as a weighing facility operator should receive a notification message, so that the weighing facility operator can quickly go remove the accumulated debris from under the load cell. The notification message may include an indication of the type and cause of the event, the time of the event, and other information, such a plot of current and past debris levels, load cell identifying information, and/or any other host related information.

The one or more rules defining the events may be defined during the configuration process by a user and/or predefined as default rules (which may be reconfigured by a user or may be automatically adapted by the remote monitoring system over time to accommodate the unique characteristics and environmental conditions of a particular load cell. In some example implementations, the one or more rules may define a threshold value representative of a severity of the event that should be reported to the one or more remote computing devices, the times of day when a notification message should be sent to each of the remote computing devices, the identities (e.g., phone number, Internet Protocol address, email address, and the like) of the one or more remote computing devices, and the like.

Furthermore, the one or more rules may include escalation rules, so that events can be handled differently based on severity of event, type of event, and/or lack of responsiveness by a designated remote computing device. For example, a rule may define that a sensed value below or a above a set threshold value should not be the subject of a notification message to remote computing device (although an alert may be indicated locally on the main unit); another rule may define that a sensed value between a range of values should be the subject of a notification message to remote computing devices; while another rule may define sending, when a critically out of line value is detected, notification messages and alerts to remote computing devices may be pushed with an indication of high importance. In some example implementations, the rules used to trigger alerts regarding some operating characteristics may be different from the rules used to send notification messages for other operating characteristics, although one or more of the rules may be the same as well.

In some example implementations, the secure server may send a notification message to a push notification service, which then pushes a notification to the remote computing device. Examples of push notification services include the Apple Push Notification Service (APNS) and Google Cloud Messaging, although any other messaging mechanism including email, short messaging service, tweets, and the like may be used as well. In the case of APNS, the remote computing device (or a notification message center therein) may establish an Internet Protocol (IP) connection with the APNS. This connection may be encrypted, persistent, and/or accredited, so that the notification service can send notification messages to the notification message center even when the remote computing device is not actively being used. For example, the notification message center may alert the user of the remote computing device that a notification message had arrived for the remote computing device.

In an implementation utilizing a push notification service, the notification service may receive a notification message from the secure server. The notification message may include a destination address, such as a phone number of the remote computing device, an IP address, and the like, and a payload, such as the contents of the notification message. Returning to the previous example regarding debris level, the notification message may include the phone number of remote computing device and a short text message, such as a high debris level value, time of measurement of the value, and/or an identity of the load cell. The notification message may be limited to 256 bytes, although other sized messages may be used as well. In any case, the notification service pushes the notification message to remote computing device via a connection, such as an Internet Protocol (IP) connection, between the notification service and a notification message center at the remote computing device. When the notification message center at the remote computing device receives the notification message, the notification message center may display the notification message, generate a sound, a vibration, and another other indication to a user of the remote computing device. Additionally, in some example implementations, the notification message center or a user of the remote computing device may activate the dashboard if the dashboard at the remote computing device is not actively being used. The notification service may be used in implementations in which the remote computing device, such as a smart phone and the like, that places the remote monitor or the applications therein in an idle or an inactive mode to conserve power or reduce signaling to/from the network.

The main unit 52 is configured to receive sensed data from the plurality of sensors on the at least one sub-unit 54, 54'. According to embodiments the main unit 52 includes a sensor electronics module. The sensor electronics module may include sensor electronics that are configured to process sensor information, such as sensor data, and generate transformed sensor data and displayable sensor information. For example, the sensor electronics module may transform sensor data into one or more of the following: filtered sensor data, raw sensor data, calibrated sensor data, rate of change information, trend information, rate of acceleration information, sensor diagnostic information, location information (which may be provided by a location module providing location information, such as global positioning/navigation system information), alarm/alert information, calibration information, smoothing and/or filtering algorithms of sensor data, and/or the like.

According to embodiments, the main unit 52 includes a processor module and may provide the hardware, firmware, and/or software that enable wireless communication between the components of the system 50. A variety of wireless radio technologies that can be implemented including Bluetooth, Bluetooth Low-Energy, the ANT protocol, NFC (near field communications), ZigBee, IEEE 802.11, IEEE 802.16, cellular radio access technologies, radio frequency (RF), infrared (IR), paging network communication, magnetic induction, satellite data communication, spread spectrum communication, frequency hopping communication, near field communications, and/or the like.

According to embodiments the processor of the main unite 52 comprises a digital filter, such as for example an infinite impulse response (IIR) or a finite impulse response (FIR) filter. This digital filter may smooth a raw data stream received from sensors of the at least one sub-unit 54, 54'. Generally, digital filters are programmed to filter data sampled at a predetermined time interval (also referred to as a sample rate). In some example implementations, such as when the system is configured to measure the operating characteristics of the load cell at discrete time intervals, these time intervals determine the sampling rate of the digital filter. In some example implementations, the system 50 is configured to measure continuously the operating characteristics of the load cell, for example, using a current-to-frequency converter. In these current-to-frequency converter implementations, the processor may be programmed to request, at predetermined time intervals (acquisition time), digital values from the integrator of the current-to-frequency converter. These digital values obtained by the processor may be averaged over the acquisition time due to the continuity of the current measurement. As such, the acquisition time may be determined by the sampling rate of the digital filter.

The processor may further include a data generator configured to generate data packages for transmission to remote computing devices. Furthermore, the processor may generate data packets for transmission to these outside sources via a telemetry module. In some example implementations, the data packages may, as noted, be customizable and/or may include any available data, such as a time stamp, displayable sensor information, transformed sensor data, an identifier code for the sensor and/or sensor electronics module, raw data, filtered data, calibrated data, rate of change information, trend information, error detection or correction, and/or the like.

The processor may also include a program memory and other memory. The program memory may be implemented as a semi-static memory for storing data, such as an identifier for a coupled sensor to configure the system to perform one or more of the operations/functions described herein. For example, the program code may configure processor to process data streams or counts, filter, calibrate, perform fail-safe checking, and the like.

The memory may also be used to store information. For example, the processor including memory may be used as the system's cache memory, where temporary storage is provided for recent sensor data received from the sensors of the sub-units. In some example implementations, the memory may comprise memory storage components, such as read-only memory (ROM), random-access memory (RAM), dynamic-RAM, static-RAM, non-static RAM, easily erasable programmable read only memory (EEPROM), rewritable ROMs, flash memory, and the like.

According to embodiments, the remote computing device 60 includes a user interface, which may include a variety of interfaces, such as one or more buttons, a liquid crystal display (LCD), a vibrator, an audio transducer (e.g., speaker), a backlight, and/or the like. The components that comprise the user interface may provide controls to interact with the main unit 52 of the system 50 or with the controls of the load cell. One or more buttons may allow, for example, toggle, menu selection, option selection, status selection, yes/no response to on-screen questions, a "turn off" function (e.g., for an alert), a "snooze" function (e.g., for an alert), a reset, and/or the like. The LCD may provide the user with, for example, visual data output. The audio transducer (e.g., speaker) may provide audible signals in response to triggering of certain alerts. In some example implementations, audible signals may be differentiated by tone, volume, duty cycle, pattern, duration, and/or the like. In some example implementations, the audible signal may be configured to be silenced (e.g., snoozed or turned off) by pressing one or more buttons or selection on a display device (e.g., key fob, cell phone, and/or the like).

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The foregoing description is illustrative of particular embodiments of the invention but is not meant to be a limitation upon the practice thereof. The following claims, including all equivalents thereof, are intended to define the scope of the invention.

The invention claimed is:

1. A method for remote monitoring of operating characteristics of a load cell, the method comprising:
   receiving from a plurality of sensors, at a main unit, sensed data indicative of a plurality of operating characteristics of a load cell, said operating characteristics including at least one of zero counts, individual load cell counts, counts at various positions on the load cell, number of weighments, highest weighment of the day, weight measurements, temperature, or any combination thereof and at least one of water level, motion, depth of debris under the load cell, metal in the vicinity of the load cell, or any combination thereof;
   analyzing at a main unit the sensed data for statistical control;
   sending alerts to a remote computing device when sensed data of an operating characteristic is outside of a preset threshold indicating an error with the load cell; and
   reporting all of the sensed data to the remote computing device to indicate a root cause of the error with the load cell.

2. The method of claim 1 further comprising first installing the main unit and the plurality of sensors on a load cell.

3. The method of claim 1 further comprising calibrating the main unit and the plurality of sensors to gather initial data points to set up statistical tests.

4. The method of claim 3 wherein calibrating the main unit and the plurality of sensors is based on the load cell and an environment in which the load cell operates.

5. The method of claim 1 wherein analyzing at a main unit the sensed data for statistical control includes continually checking the sensed data of critical measurements for statistical control.

6. The method of claim 1 wherein analyzing at a main unit the sensed data for statistical control includes periodically checking the sensed data of all measurements for statistical control.

7. The method of claim 1 further comprising periodically compiling all sensed data regarding the operating characteristics of the load cell into trend reports.

8. The method of claim 7 further comprising sending the trend reports to the remote computing device.

9. The method of claim 1 wherein the main unit automatically reestablishes a plurality of preset thresholds.

10. A system for carrying out the method of claim 1, the system comprising:
    a main unit installed near a load cell;
    a first sub-unit coupled to a scale of the load cell, the first sub-unit comprising a first plurality of sensors, the first sub-unit being in wired communication with the main unit; and
    at least one remote computing device in network communication with the main unit.

11. The system of claim 10 wherein the main unit is electrically connected to a scale indicator of the load cell.

12. The system of claim 10 wherein the main unit comprises at least one printed circuit board (PCB), a local computing device, and a programmable microcontroller.

13. The system of claim 10 wherein the first sub-unit is fixed to an underside of the scale.

14. The system of claim 10 wherein the first plurality of sensors comprise and accelerometer, a magnetometer, an air temperature sensor, and a depth sensor.

15. The system of claim 10 further comprising a second sub-unit comprising a second plurality of sensors, the second sub-unit being in wired communication with the main unit.

16. The system of claim 15 wherein the second sub-unit is in wired communication with the main unit through the first sub-unit.

17. A system for remote monitoring of operating characteristics of a load cell carrying comprising:
    a main unit installed near a load cell;
    a first sub-unit coupled to a scale of the load cell, the first sub-unit comprising a first plurality of sensors, the first sub-unit being in wired communication with the main unit;
    a second sub-unit comprising a second plurality of sensors, the second sub-unit being in wired communication with the main unit, wherein the second plurality of sensors comprise a water level sensor and a water temperature sensor; and
    at least one remote computing device in network communication with the main unit;
    wherein the main unit is configured to receive from a plurality of sensors sensed data indicative of a plurality of operating characteristics of a load cell, to analyze the sensed data for statistical control, and to send alerts to the at least one remote computing device when the sensed data of an operating characteristic is outside of a preset threshold.

18. The system of claim 15 wherein the second sub-unit is positioned within a drainage system of the load cell.

19. The system of claim 10 wherein the at least one remote computing device is a smart phone, a computer, or a tablet.

* * * * *